(12) United States Patent
Waterman (10) Patent No.: US 7,771,146 B2
(45) Date of Patent: Aug. 10, 2010

(54) APPARATUS AND METHOD FOR SHAVING THE INSIDE OF BARRELS

(75) Inventor: Breck Waterman, Keswick (AU)

(73) Assignee: Southern Cross Cooperage Pty Ltd, Keswick (AU)

( * ) Notice: Subject to any disclaimer, the term of this patent is extended or adjusted under 35 U.S.C. 154(b) by 0 days.

(21) Appl. No.: 12/271,367

(22) Filed: Nov. 14, 2008

(65) Prior Publication Data

US 2010/0122614 A1 May 20, 2010

(51) Int. Cl.
*B23C 1/12* (2006.01)
*B23C 3/00* (2006.01)
*B27H 5/00* (2006.01)
*B25J 9/06* (2006.01)

(52) U.S. Cl. ........... 409/201; 409/143; 409/125; 409/188; 409/199; 409/216; 318/568.16; 318/570; 147/1; 901/9; 901/41; 901/47

(58) Field of Classification Search ........... 409/143, 409/138, 201, 211, 216, 235, 199, 200, 125–127, 409/180, 182, 186, 188, 189, 195, 197, 198; 147/1; 318/568.16, 570, 572, 577; 144/144.1, 144/144.41, 2.1, 386, 387, 392, 394, 402, 144/408, 416; 901/9, 2, 41, 46–47
See application file for complete search history.

(56) References Cited

U.S. PATENT DOCUMENTS 286,661 A * 10/1883 Weindel ........... 147/1

884,138 A * 4/1908 Drexler ........... 147/1
1,126,450 A * 1/1915 Haddigan ........... 147/1

(Continued)

FOREIGN PATENT DOCUMENTS

DE 100339 C1 * 12/1898

(Continued)

OTHER PUBLICATIONS

Machine Translation of FR-2836846-A1, which French patent was published in Sep. 2003.*

(Continued)

*Primary Examiner*—Erica E Cadugan
(74) *Attorney, Agent, or Firm*—Weiner & Burt, P.C.; Irvine M. Weiner; Pamela S. Burt (57) ABSTRACT

The present invention relates to an apparatus and method for shaving the inside of barrels. In particular, the present invention relates to reconditioning used wine barrels by shaving the inside surface to a predetermined depth, ready for re-crozering, toasting, and re-use. Conventional shaving methods typically involve routing the internal surface by hand, but this technique is problematic in that it is a very slow process, the quality of the wood is often adversely affected, and there is no way of ensuring that the surface will be shaved to the same depth across the entire surface. Therefore, the resultant internal dimensions of the barrel are not reflective, relatively, of the original barrel surface. The apparatus of the present invention includes a scanning device adapted to scan the internal dimensions of the barrel, and a cutting device adapted to shave the internal surface to a predetermined depth relative to the scanned internal dimensions.

16 Claims, 5 Drawing Sheets

U.S. PATENT DOCUMENTS

| | | | | |
|---|---|---|---|---|
| 1,239,486 | A | * | 9/1917 | Highams ........................ 147/1 |
| 4,827,994 | A | * | 5/1989 | Whitford ..................... 144/392 |
| 4,897,586 | A | * | 1/1990 | Nakata et al. .......... 318/568.16 |
| 5,630,265 | A | * | 5/1997 | Stone .......................... 409/143 |
| 6,836,700 | B2 | * | 12/2004 | Greene et al. ................. 901/43 |
| 2008/0102179 | A1 | * | 5/2008 | Rogers ........................ 426/523 |
| 2009/0126830 | A1 | * | 5/2009 | Waterman ..................... 147/1 |

FOREIGN PATENT DOCUMENTS

| | | | |
|---|---|---|---|
| DE | 195909 | C1 * | 2/1908 |
| ES | 2292282 | A1 * | 3/2008 |
| FR | 2834665 | A1 * | 7/2003 |
| FR | 2836846 | A1 * | 9/2003 |
| FR | 2854094 | A1 * | 10/2004 |
| GB | 230466 | A1 * | 10/1925 |
| GB | 319562 | A1 * | 9/1929 |
| GB | 2154488 | A * | 9/1985 |
| SU | 1437228 | A1 * | 11/1988 |

OTHER PUBLICATIONS

Machine Translation of FR-2834665-A1, which French patent was published in Jul. 2003.*

* cited by examiner

APPARATUS AND METHOD FOR SHAVING THE INSIDE OF BARRELS

The present invention relates to barrel reconditioning and, in particular, to an apparatus and method for controllably shaving the inside surface of barrels. The present invention is intended for particular use on wine barrels, however, is not intended to be limited to such use.

BACKGROUND OF THE INVENTION

The applicant is the owner of a co-pending Australian published patent application namely, 2006202071 relating to the production of barrel staves. The contents of this co-pending application is incorporated by reference herein.

Wine is traditionally aged in oak barrels. The oak is integral to aging and imparting certain flavours to the wines. Wine fermenting and aging in wood barrels extracts flavour components from the wood and leaves a residue of precipitated materials such as tartrates, fining agents or yeast. Wine processing often leaves undesirable bacterial infections in the barrels for which there is no current remedy.

Wine penetrates into a solid barrel stave approximately 0.5-0.8 centimeters. Over time (typically after two to three uses), all components which can be extracted from the oak will be, and the residue left in the wood can begin to sour or block the membrane exchangability of the wood. The barrel is then considered exhausted and is viewed either as a liability because of contamination, or as neutral storage for additional vintages.

Currently, reconditioning involves transporting used barrels from vineyards to cooperage plants where the internal surfaces of the barrels are shaved and then toasted for reuse. Shaving methods vary from more simple techniques involving bottom cutting routers and rotating wire brushes, to more complex methods involving motorised cutting apparatus. Although inadequate, however, these services remain available because they are able to remove a small amount of the barrel's inner surface for a very modest fee. Conventional cutting devices suffer from some of the following drawbacks:

Current techniques, particularly manual shaving methods, often result in uneven surfaces and do not provide a shaved surface that is reflective of the pre-shaved surface.

Such techniques are also problematic because they do not ensure that all areas of the barrel are shaved to a depth where the exposed wood is uncontaminated from previous wine.

The quality of the surface is often compromised using traditional shaving techniques. Sometimes, the shaved surface requires sanding and this causes greater deterioration to the barrel surface because it grinds the exhausted wood into the pores of the newly exposed wood. When the barrel is retoasted, very undesirable "off" flavours are baked into the new surface.

The time taken to completely shave the inside of a barrel is significant, given that this is often done manually. The skilled addressee would realise the benefits in being able to quickly and efficiently recondition a barrel back to a useful state without the need for manual labour.

It is an object of the present invention to overcome this problem or to at least provide the public with a useful alternative.

SUMMARY OF THE INVENTION

In one form of the invention there is proposed an apparatus for shaving the inside surface of barrels, said apparatus including:

a scanning means adapted to scan the internal dimensions of the barrel;

a cutting means adapted to shave the internal surface of the barrel to a predetermined depth relative to the scanned internal dimensions.

Preferably said scanning means is adapted to vertically traverse the inside surface of the barrel to thereby scan a portion thereof with each pass.

In preference said cutting means is adapted to vertically traverse the inside surface of the barrel to thereby shave a portion thereof with each pass.

In preference movement of said scanning and cutting means relative to the inside surface of the barrel is controlled using a control means.

Preferably said apparatus includes a computing device into which at least one movement parameter for the scanning means is input and subsequently processed to form a first set of movement data to be communicated to the control means.

In preference said scanning means is further rotatable about a vertical axis, whereby said at least one movement parameter includes a scanning means start angle.

Preferably said at least one movement parameter includes a stop angle for the scanning means.

In preference said scanning means is pivotable about a horizontal axis, said at least one movement parameter thereby including the pitch of said scanning means.

In preference at least one movement parameter for the cutting means can also be input into said computing device and subsequently processed, together with dimensional data from the scanning means, to form a second set of movement data to be communicated to the control means.

Preferably said cutting means is further rotatable about a vertical axis, whereby said at least one movement parameter includes a cutting means start angle.

Preferably said at least one movement parameter includes a stop angle for the cutting means.

Preferably said cutting means is pivotable about a horizontal axis, said at least one movement parameter thereby including the pitch of said cutting means.

Preferably said at least one movement parameter includes a cut depth for each vertical pass of the cutting means.

Preferably said movement parameters include cut depth for a first pass of the cutting means and a cut depth for a second pass of the cutting means.

In preference said cutting means is in the form of an electrically driven router mounted to the end of a robotic arm capable of a range of controlled movements inside the barrel.

Advantageously said scanning means is in the form of a laser scanner suspended beneath said electrically driven router and moveable therewith.

Advantageously said robotic arm is pneumatically operated.

Preferably said robotic arm is mounted above a supporting table including an adjustable barrel mounting means associated therewith.

In preference said adjustable barrel mounting means is in the form of a sub-frame to which said barrel is attachable, said sub-frame being vertically moveably between a first position in which said attached barrel is grounded and a second position in which the attached barrel is ready to undergo shaving by said robotic arm.

In preference said sub-frame is moveable by a pneumatic cylinder.

In a further form of the invention there is proposes a method of shaving the inside of barrels, including the steps of:

scanning the internal dimensions of the barrel using a scanning means; and shaving the inside surface of the barrel to a predetermined depth relative to the scanned internal dimensions using a cutting means.

Preferably said scanning means and cutting means are adapted to vertically traverse the inside of the barrels during operation, whereby following each one or more vertical pass, the scanning and cutting means rotate by a predetermined angle before starting a further one or more vertical pass, and so on.

In preference movement of the scanning means and cutting means inside the barrel is controlled using a control means.

Preferably the scanning means movement data communicated to the control means is based at least partially upon parameters input into an associated computing device.

Preferably said parameters include the stop angle, start angle, and pitch of the scanning means.

Preferably the cutting means movement data communicated to the control means is based at least partially upon parameters input into an associated computing device, and barrel dimensional data from the scanning means.

Preferably said parameters include the stop angle, start angle, pitch, and cut depth of each vertical pass of the cutting means.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

Figure 1:
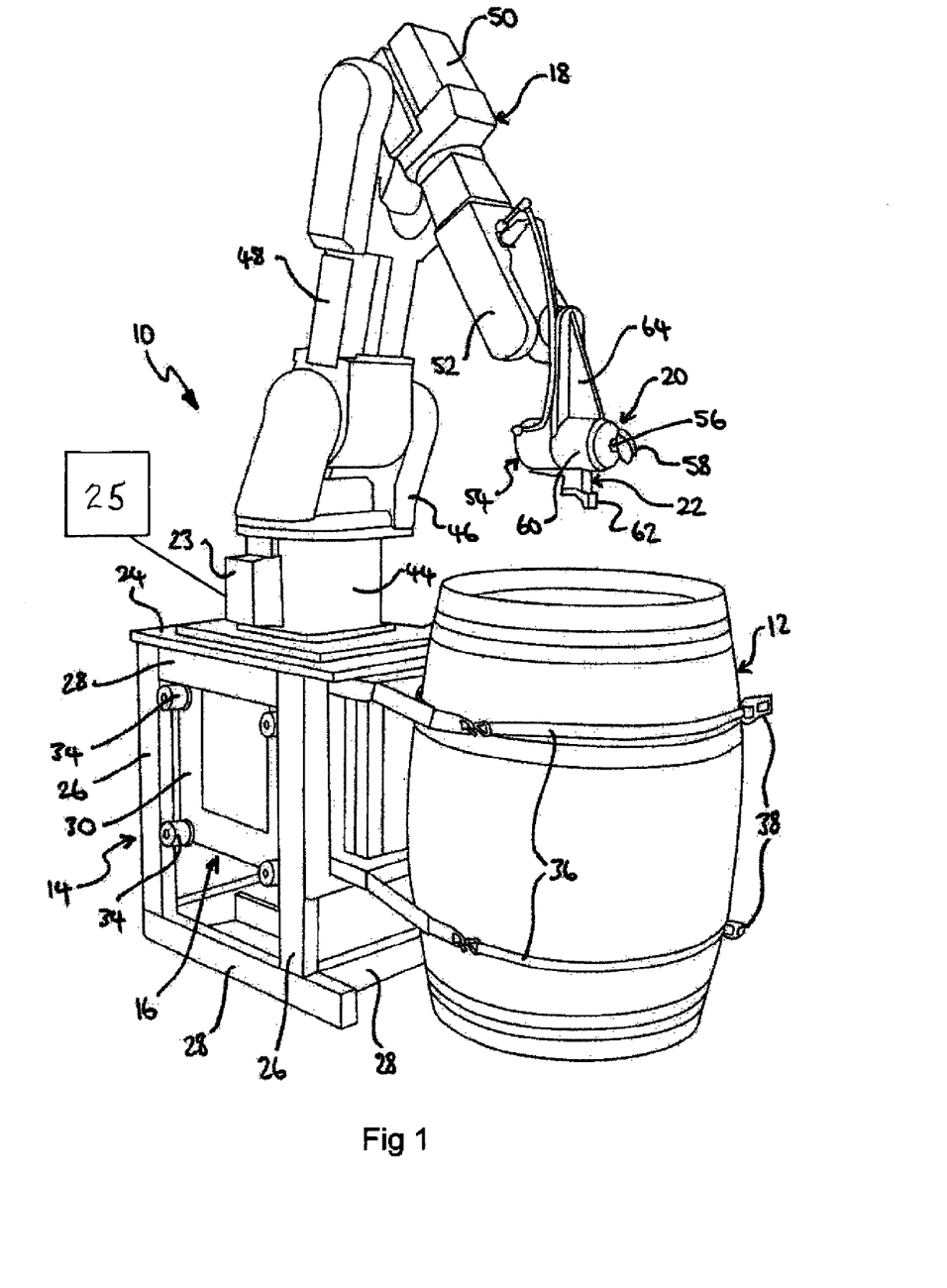
FIG. 1 illustrates a perspective view of an apparatus for shaving the inside of a barrel in accordance with the present invention.
Figure 2:
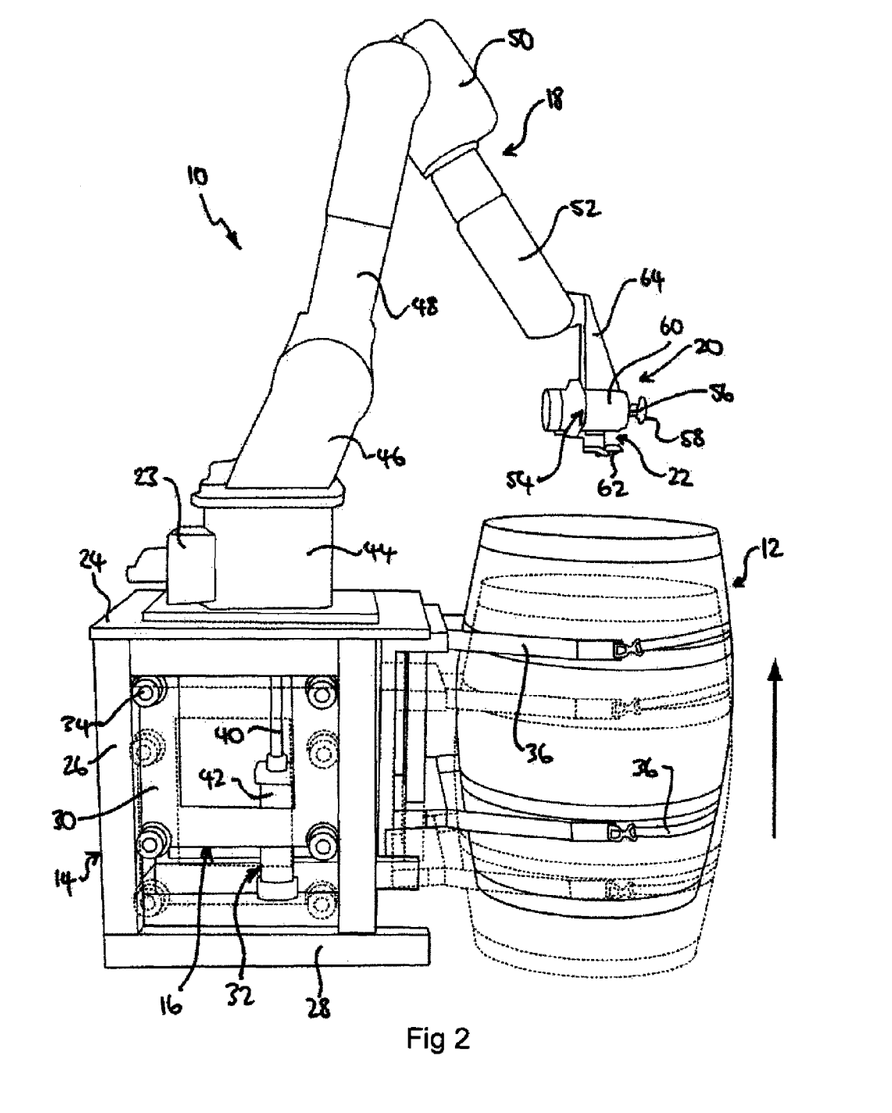
FIG. 2 illustrates a side view of the apparatus of FIG. 1 wherein the barrel is in a raised position.

The present invention relates to an apparatus 10 and method for shaving the inside surface 11 of barrels, in particular, used wine barrels 12 which require reconditioning for re-use. Referring firstly to FIGS. 1 and 2, the apparatus 10 comprises a base frame 14 having a height adjustable barrel mounting means 16 associated therewith, a robotic arm 18 mounted above the base frame 14, and a router assembly 20 positioned at the free end of the robotic arm 18, the router assembly 20 including a laser 22 suspended therefrom. The robotic arm 18 is capable of a range of controlled movements. In brief, the router assembly 20 and laser 22 are controllably moved along the inside surface 11 of the barrel 12 to:

1) scan the internal dimensions of the barrel using the laser 22; and 2) shave the inside surface to a predetermined depth using the router assembly 20.

The base frame 14 is in the form of a substantially rectangular table having a top surface 24 supported above four vertical legs 26 having horizontal reinforcing beams 28 extending therebetween, including at the base of the frame 14. The configuration of the base frame 14 is not critical, provided it is robust enough to support the weight of the robotic arm even when the arm is at full extension away from the frame 14. The top surface 24, as well as the lowermost reinforcing beams 28 on the left and right hand sides of the robotic arm 18, extend forwardly from the frame 14 in the same direction as that of the robotic arm 18 to facilitate its support.

The height adjustable barrel mounting means 16 is in the form of a sub-frame 30 housed inside the base frame 14, the sub-frame 30 being capable of vertical movement relative to the base frame 14 through actuation of a pneumatic cylinder 32. Upward and downward movement is aided through the use of guide rollers 34 which slideably engage the inside surfaces of the legs 26 as shown in the drawings. A portion of the sub-frame 30 also extends forwardly from the base frame 14 in the direction as the robotic arm 18, to which a pair of spaced apart straps 36 for wrapping around and engaging the barrel 12 are attached. The straps 36 may be attached to the sub-frame 30 by any suitable means and may include a tensioning means 38 for tightening the straps 36.

It is to be understood that there may well be a plurality of straps used, or other alternate means of supporting the barrel 12. For example, a barrel floor support (not shown) extending out from the sub-frame 30 could be used. The benefit of the embodied configuration though is that the router assembly 20 can be moved vertically past the bottom end of the barrel 12 if need be, as there is no base structure below to prevent such movement. Furthermore, a floor structure would require further material, would increase the weight of the apparatus, and would possibly require a stronger pneumatic cylinder.

As mentioned, the sub-frame 30 is capable of vertical movement through actuation of a pneumatic cylinder 32. The pneumatic cylinder 32 is positioned centrally inside the base frame 14, and includes a ram 40 adapted to engage a portion of the sub-frame 30 such that when the ram 40 is in a retracted position inside the cylinder 42, the attached barrel 12 is grounded in the position shown in FIG. 2 in hidden lines, and when the ram 40 is extended upwardly, the barrel 12 is at a height suitable for it to undergo scanning and cutting in accordance with the present invention.

The robotic arm 18 comprises a base 44, an attached shoulder 46, a first arm member 48 pivotably linked to the shoulder 46, an elbow 50 pivotably linked to the opposed end of the first member 48, and a second arm member 52 rotatably linked to the elbow 50. The router assembly 20 is pivotably linked to the free end of the second arm member 52. Therefore, the robotic arm 18 is capable of pivoting in three ways, whereby each pivot axes extends transversely to the forward direction of the arm 18. The present invention is not intended to be limited to this particular robotic arm configuration, for example, the arm may be made to pivot in four or five ways, or along different axes, if desired.

Figure 3A:
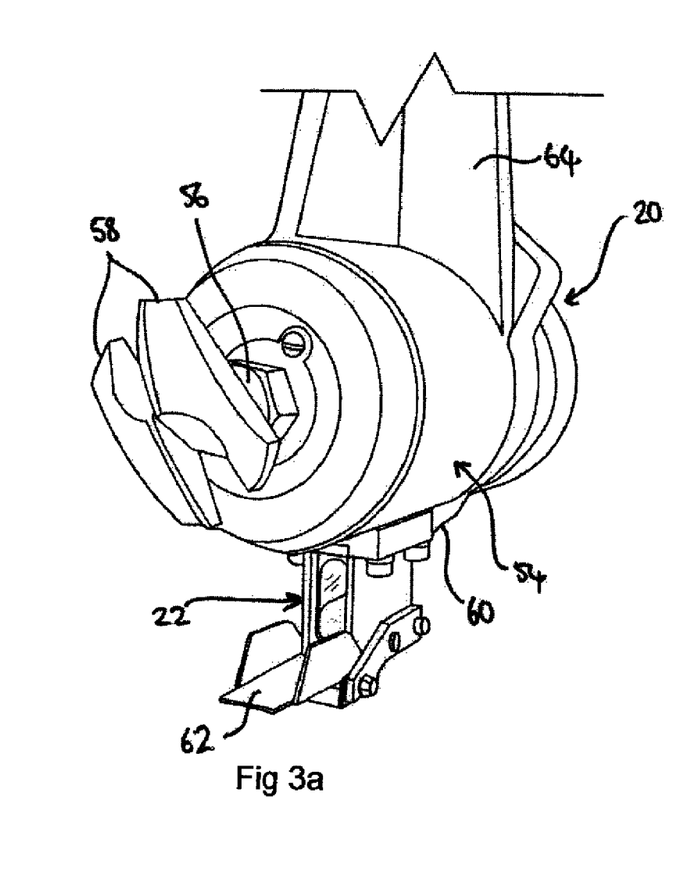
FIG. 3a illustrates an enlarged perspective view of a router assembly forming part of the apparatus of FIG. 1 whereby the laser cover is open.
Figure 3B:
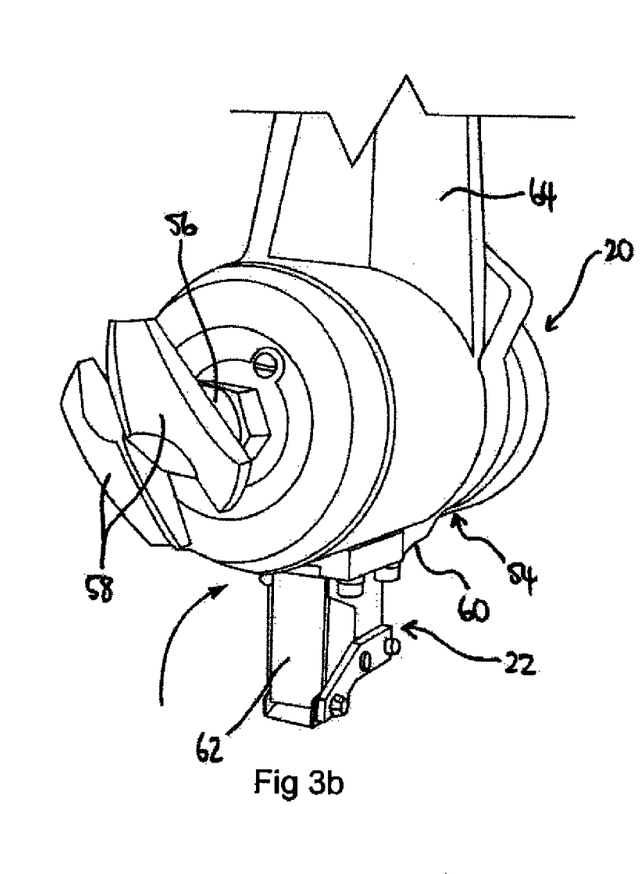
FIG. 3b illustrates an enlarged perspective view of a router assembly forming part of the apparatus of FIG. 1 whereby the laser cover is closed.

The router assembly 20 is shown most clearly in FIGS. 3a and 3b. The assembly 20 includes an electric motor 54, a drive shaft 56 driven by the motor 54, and twin router blades 58 removably attached to the end of the drive shaft 56. As mentioned, a laser 22 is mounted beneath the motor housing 60 and points in the same direction as the twin blades 58. The laser 22 includes a shutter 62 that is pivotable from the open position shown in FIG. 3a, to the closed position shown in FIG. 3b. Movement of the shutter 62 is controlled so that it opens during scanning of the internal surface 11 of the barrel 12, and closed at all other times. The motor housing 54 is suspended from a bracket 64 pivotably linked to the second arm member 52 as described above.

Figure 4:
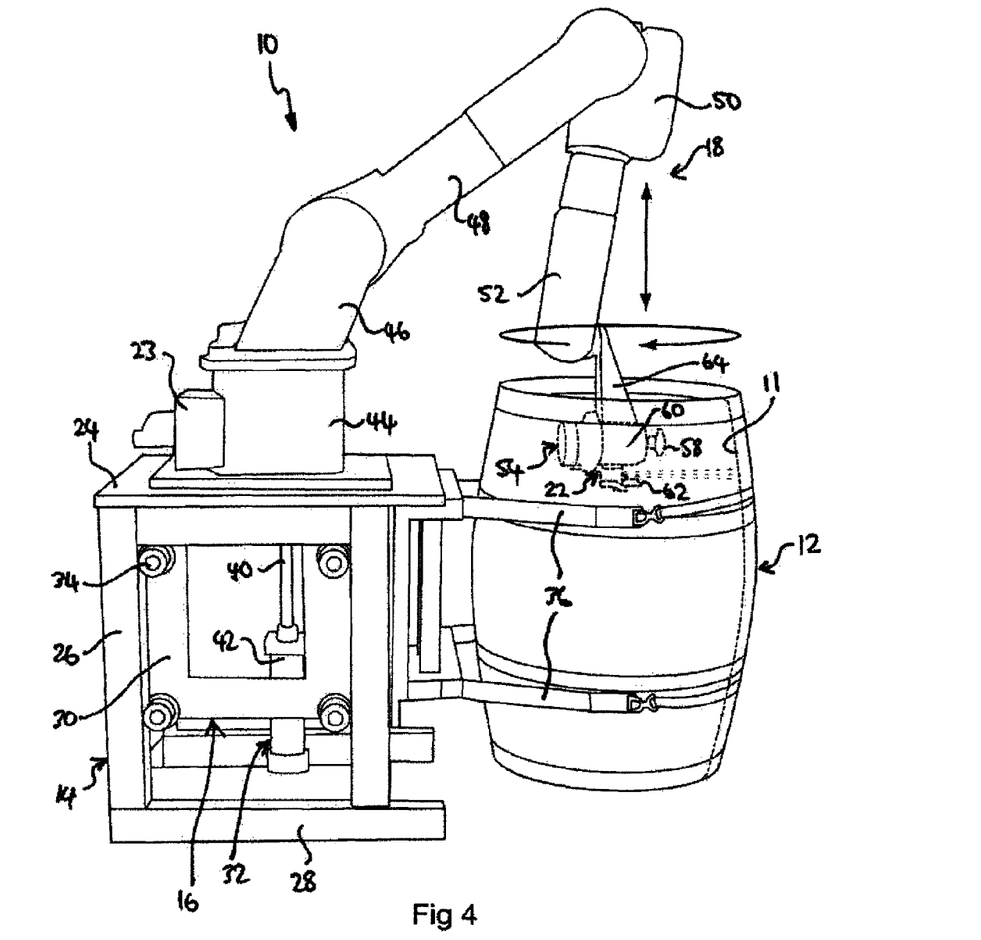
FIG. 4 illustrates a side view of the apparatus of FIG. 1 performing a scan of the inside surface of the barrel.
Figure 5:
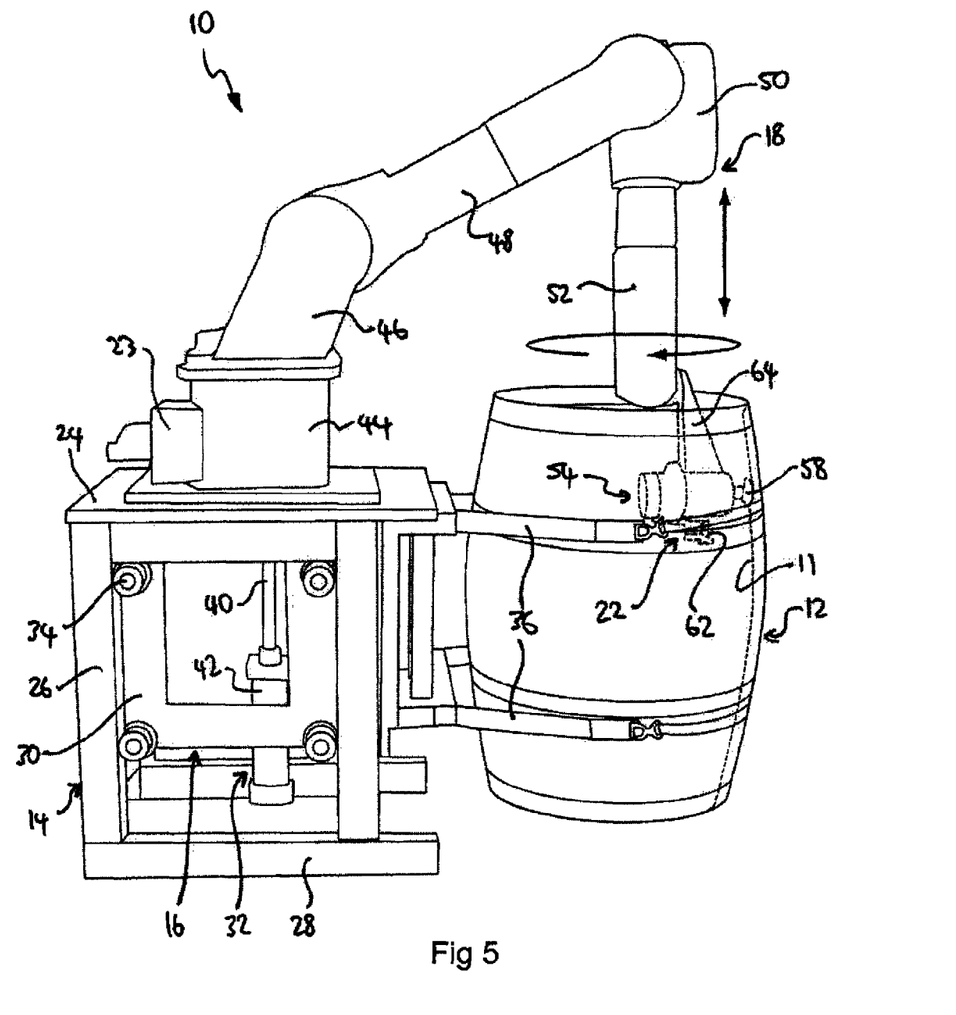
FIG. 5 illustrates a side view of the apparatus of FIG. 1 shaving the inside surface of the barrel.

The robotic arm 18 is shown in FIGS. 1 and 2 in a rest position when not in use, that is, when the first member 48 extends substantially upwardly and outwardly with respect to the base frame 14, and the second member 18 extends downwardly and outwardly. FIGS. 4 and 5 illustrate the robotic arm 18 when in use. It can be seen that in the in-use position, the first arm member 48 is more extended because it has been pivoted downwardly, as has the second member 52 which now extends inwardly slightly to ensure the router assembly 20 is positioned centrally inside the barrel, and the router blades 58 and laser 22 are aligned substantially horizontally. As will become apparent though, the router assembly 20 and laser 22 are pivoted to account for the barrel pitch and are aligned horizontally only when moving past the mid-section of the barrel 12.

The way in which the robotic arm 18 operates will not be described in great detail as this should be known to those skilled in the art. In a preferred embodiment, the joints are controlled pneumatically. At the base 44 of the arm 18 is a control box 23 which is connected to an external computing device (not shown). The computing device includes software into which different scanning and cutting parameters may be input by an operator, such data being transmitted to the control box 23 to operate the pneumatic joints accordingly. The control box 23, computing device (25) and associated software is also used to control movement of the pneumatic cylinder 32, and the shutter 62.

According to the present invention, the internal surface of the barrel is to be scanned so that the internal dimensions are recorded, and then material removed to a depth relative to the scanned dimensions. Those skilled in the art would realise that if a pre-scan of the surface did not take place, movement of the router would be based on a prediction of the internal dimensions and an inaccurate cut would result. By firstly scanning the surface, it can be shaved to a uniform depth all the way around the barrel. The process ensures that the same amount of wood is removed at every point along the barrel surface, resulting in a barrel which has substantially the same internal relative dimensions to that of the original barrel, ready for re-crozering, re-toasting and re-use.

As shown in FIG. 4, the router assembly 20 is moved into the centre of the barrel. Then, using upward and downward strokes, the laser 22 is able to map the dimensions of the internal surface 11. Once the router assembly 20 has completed one downward stroke, it is rotated a predetermined distance corresponding approximately with the width of the laser beam on the internal surface, and then an upward stroke is commenced. This is continued until the router assembly has rotated 360 degrees and the entire internal surface 11 scanned. This data is recorded and transmitted to the computing device, and is processed together with data which is input by the operator, to produce cutting data which is subsequently transmitted to the control box 23. The cutting data defines the required movements of the robotic arm to shave the inside surface 11 of the barrel 12.

FIG. 5 illustrates the router assembly in use. As with the scanning process, the shaving process involves vertical strokes along the internal surface 11, until the router assembly has rotated 360 degrees to complete the cut. It is to be understood that any appropriate sequence can be set up by an operator. For example, the scan and cut may be achieved using any number of vertical passes rather than just one. In fact, as will become apparent, it is preferred that the shave take place in two passes whereby half the material is moved in a downward stroke, for example, and the remaining depth of material is removed in an upward stroke. The present invention is not intended to be limited to any particular start angle, stop angle, pitch, or cut depth as these parameters are all variable and may be adjusted to suit different barrels.

The scan parameters which may be input by an operator are as follows:

Start Angle (0-359 degrees)—this is the initial angle which is typically first set to zero, but may be set at any required angle. For example if a barrel shaving process is started and stopped at a specific angle, then it can be recommenced at that start angle at a later time.

Stop Angle (0-359 degrees)—this is the angle by which the second arm member 52 and hence the router assembly 20 and laser 22 are rotated, following each vertical scan. For example, if the start angle is set to 0 degrees and the stop angle is set to 12 degrees, the laser 20 will perform a first vertical scan and then rotate about its axis by 12 degrees before commencing a second vertical scan, and so on. At this setting, the router assembly will perform thirty vertical scans per barrel.

Pitch (1-36 degrees)—this parameter accounts for the curve of the internal surface, and for a standard wine barrel is typically set to 10 degrees whereby when the router assembly is at the top of the barrel it is angled upwardly by 10 degrees, when lowered to the middle of the barrel is aligned horizontally at 0 degrees, and when lowered to the bottom of the barrel is angled 10 degrees downwardly. Alteration of this angle is achieved by way of controlled pivot of the bracket 64 relative to the second arm member 52.

Similarly, the variable cutting parameters are as follows:

Start Angle (0-359 degrees)—This is as per the scan start angle and is typically first set to 0 degrees.

Stop Angle (0-359 degrees)—This angle is determined by the width of the shave resulting from contact between the router blades and the surface. In the embodiment shown, an angle of 10 degrees is input into the software.

Pitch (1-36 degrees)—A pitch angle of approximately 5 degrees is typically used here for a standard wine barrel.

Cut depth pass 1 (mm)—As mentioned the router assembly can perform one or more passes on the internal surface during the cutting process. Therefore in order to shave 8 mm off the surface, the pass 1 cut depth will be set to −4 mm.

Cut depth pass 2 (mm)—If 8 mm is to be shaved off and 4 mm has already been shaved in the first pass, then −8 mm should be input here.

Those skilled in the art should now realise the benefits of the present invention. The apparatus 10 provides a means of partially reconditioning a used wine barrel by shaving the inside surface to a predetermined depth, ready for re-crozering, toasting, and re-use. Conventional shaving methods typically involve routing the internal surface by hand, but this technique is problematic in that it is a very slow process, the quality of the wood is often adversely affected, and there is no way of ensuring that the surface will be shaved to the same depth across the entire surface. Therefore, the resultant internal dimensions of the barrel are not reflective, relatively, of the original barrel surface.

In first scanning the internal dimensions, and then applying a controlled shave across the internal surface as a function of the scanned dimensions, an extremely accurate cut can be performed. The robotic arm of the present invention can move at approximately 1 meter/second, which means the internal surface of one barrel can be shaved within a time frame of 15-30 minutes. Operation of the apparatus can be modified to suit particular barrels in that parameters such as the scan/cut start and stop angles, the pitch, and the cut depth are variable, and can be input into the system.

It is to be understood that the apparatus used to shave the barrel need not be limited to a twin blade router assembly 20 as embodied herein. Any suitable shaving device can be used. It is to be further understood that the shaving and scanning apparatus could remain stationary and the barrel itself could be moved relative thereto, thereby scanning and shaving the internal surface. For example, a platform upon which the barrel rests may be rotatable and vertically moveable with respect to the scanner and router.

A more sophisticated laser sensor could also be used, in particular, one which is capable of scanning around 360 degrees of the barrel surface instead of only a radial portion. In using such a laser, only one vertical movement of the laser would be required to scan the entire cross-sectional internal dimension.

The computing device (not shown) could also be used to save data relating to such things as the amount of material removed from the barrel, the date and time a particular barrel was shaved, and the physical state of the barrel including how many more times the barrel may be reconditioned, if any. All of this data could be stored and potentially used for future reference.

The present applicant currently manufactures barrels using an improved barrel stave jointing apparatus, including hardware and software capable of capturing and storing a number of different stave and barrel properties. It is envisaged that data relevant to a particular manufactured barrel is stored, so that when that barrel is used and returned to the cooperage for reconditioning, it can be accessed again. In such circumstances, a pre-scan of the internal dimensions may not even be necessary.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. An apparatus for shaving the inside surface of barrels, said apparatus including:
   a robotic arm;
   a scanning means attached to a free end of the robotic arm and adapted to scan the internal dimensions of the barrel to thereby provide mapped internal dimensions of the inside surface to a controller for the robotic arm;
   a cutting means in the form of a router attached to the free end of the robotic arm and adapted to shave the inside surface of the barrel to a predetermined depth relative to the scanned internal dimensions, the cutting means and scanning means being rotatable about both horizontal and vertical axes by the robotic arm.

2. An apparatus as in claim 1 wherein said scanning means is adapted to vertically traverse the inside surface of the barrel to thereby scan a portion thereof with each pass.

3. An apparatus as in claim 1 wherein said cutting means is adapted to vertically traverse the inside surface of the barrel to thereby shave a portion thereof with each pass.

4. An apparatus as in claim 1 wherein movement of said scanning and cutting means relative to the inside surface of the barrel is controlled using the controller.

5. An apparatus as in claim 4 wherein said apparatus includes a computing device into which at least one movement parameter for the scanning means is input and subsequently processed to form a first set of movement data to be communicated to the control means.

6. An apparatus as in claim 5 wherein said at least one movement parameter includes a start angle, a stop angle, and a pitch of said scanning means.

7. An apparatus as in claim 5 wherein at least one movement parameter for the cutting means can also be input into said computing device and subsequently processed, together with dimensional data from the scanning means, to form a second set of movement data to be communicated to the controller.

8. An apparatus as in claim 7 wherein said at least one movement parameter for the cutting means includes a cut depth for each vertical pass of the cutting means.

9. An apparatus as in claim 8 wherein said at least one movement parameters for the cutting means include cut depth for a first pass of the cutting means and a cut depth for a second pass of the cutting means.

10. An apparatus as in claim 7 wherein said at least one movement parameter for the cutting means includes a start angle, a stop angle, a pitch of said cutting means.

11. An apparatus as in claim 1, wherein said router is electrically driven, and said robotic arm is capable of a range of controlled movements inside the barrel.

12. An apparatus as in claim 1, wherein said scanning means is in the form of a laser scanner suspended beneath said router and moveable therewith.

13. An apparatus as in claim 1, wherein said robotic arm is pneumatically operated.

14. An apparatus as in claims 1, wherein said robotic arm is mounted above a supporting table including a height adjustable barrel mounting means associated therewith.

15. An apparatus as in claim 14 wherein said adjustable barrel mounting means is in the form of a sub-frame to which said barrel is attachable, said sub-frame being vertically moveable between a first position in which said attached barrel is grounded and a second position in which the attached barrel is ready to undergo shaving by said router of said robotic arm.

16. An apparatus as in claim 15 wherein said sub-frame is moveable by a pneumatic cylinder.

* * * * *